US012668704B2

(12) United States Patent
Kao et al.

(10) Patent No.: US 12,668,704 B2
(45) Date of Patent: Jun. 30, 2026

(54) ENCAPSULANT COMPOSITION AND FILM

(71) Applicant: INDUSTRIAL TECHNOLOGY RESEARCH INSTITUTE, Hsinchu (TW)

(72) Inventors: Yu-Chen Kao, Zhudong Township (TW); Meei-Yu Hsu, Hsinchu City (TW); Chih-Hao Lin, Zhongli City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 570 days.

(21) Appl. No.: 18/361,325

(22) Filed: Jul. 28, 2023

(65) Prior Publication Data

US 2024/0218188 A1 Jul. 4, 2024

(30) Foreign Application Priority Data

Dec. 16, 2022 (TW) .................................. 111148382

(51) Int. Cl.

| | |
|---|---|
| ***C09D 4/00*** | (2006.01) |
| ***C08F 212/12*** | (2006.01) |
| ***C08F 212/34*** | (2006.01) |
| ***C08F 216/12*** | (2006.01) |
| ***C08K 9/06*** | (2006.01) |
| ***C09D 7/62*** | (2018.01) |
| ***C09D 7/63*** | (2018.01) |
| ***C09D 125/16*** | (2006.01) |
| ***C09D 125/18*** | (2006.01) |
| ***C09D 129/10*** | (2006.01) |

(52) U.S. Cl.

CPC .............. *C09D 4/00* (2013.01); *C08F 212/12* (2013.01); *C08F 212/34* (2013.01); *C08F 216/125* (2013.01); *C08K 9/06* (2013.01); *C09D 7/62* (2018.01); *C09D 7/63* (2018.01); *C09D 125/16* (2013.01); *C09D 125/18* (2013.01); *C09D 129/10* (2013.01); *C08F 2800/20* (2013.01)

(58) Field of Classification Search

CPC ... C09D 4/00; C09D 7/62; C09D 7/63; C09D 125/16; C09D 125/18; C09D 129/10; C08F 212/12; C08F 212/34; C08F 216/125; C08F 2800/20; C08F 12/32; C08F 12/34; C08F 212/08; C08F 222/104; C08K 9/06; C08K 3/36; C08J 2325/08; C08J 5/18; C08J 7/0427; C08L 2312/00

USPC .......................................................... 523/203

See application file for complete search history.

(56) References Cited

U.S. PATENT DOCUMENTS

| | | | |
|---|---|---|---|
| 6,420,464 | B1 | 7/2002 | Kuboki et al. |
| 8,263,714 | B2 | 9/2012 | Ogura et al. |
| 8,703,845 | B2 | 4/2014 | Ogura |
| 10,156,835 | B2 | 12/2018 | Sugano et al. |
| 11,091,627 | B2 | 8/2021 | Fukuda et al. |
| 11,111,382 | B2 | 9/2021 | Fukuda et al. |
| 11,292,872 | B2 | 4/2022 | Harisaki et al. |
| 2018/0327595 | A1 | 11/2018 | Fukuda et al. |
| 2019/0119434 | A1 | 4/2019 | Fukuda et al. |
| 2020/0385514 | A1 | 12/2020 | Fukuda et al. |
| 2020/0385565 | A1 | 12/2020 | Fukuda et al. |

FOREIGN PATENT DOCUMENTS

| | | | |
|---|---|---|---|
| CN | 100467008 | C | 3/2009 |
| CN | 102888199 | A | 1/2013 |
| CN | 110167989 | A | 8/2019 |
| CN | 110168017 | A | 8/2019 |
| CN | 110177819 | A | 8/2019 |
| CN | 110177820 | A | 8/2019 |
| CN | 110191921 | A | 8/2019 |
| JP | 2006-45421 | A | 2/2006 |
| TW | 201730270 | A | 9/2017 |
| TW | 201900595 | A | 1/2019 |
| TW | 201922888 | A | 6/2019 |
| TW | I721039 | B | 3/2021 |
| TW | I748898 | B | 12/2021 |

OTHER PUBLICATIONS

English Translation of JP 2006-045421 (Year: 2006).*

Taiwanese Office Action and Search Report for Taiwanese Application No. 111148382, dated Sep. 21, 2023.

* cited by examiner

*Primary Examiner* — Hannah J Pak

(74) *Attorney, Agent, or Firm* — Birch, Stewart, Kolasch & Birch, LLP

(57) ABSTRACT

An encapsulant composition and a film are provided. The encapsulant composition includes 20-45 parts by weight of a component (A), 55-80 parts by weight of a component (B) and a component (C). The total weight of the component (A) and the component (B) is 100 parts by weight, and the weight ratio of the component (C) to the component (A) is 1:100 to 5:100. The component (A) includes first compound (A-1) and second compound (A-2), the component (B) is a non-modified inorganic powder or modified inorganic powder, and the component (C) is an initiator.

14 Claims, No Drawings

ENCAPSULANT COMPOSITION AND FILM

CROSS REFERENCE TO RELATED APPLICATIONS

This application claims priority of Taiwan Patent Application No. 111148382, filed on Dec. 16, 2022, the entirety of which is incorporated by reference herein.

BACKGROUND OF THE INVENTION

Field of the Invention

The disclosure relates to an encapsulant composition and film.

Description of the Related Art

Epoxy resin is widely used in optoelectronic and semiconductor components due to its excellent mechanical properties and good thermal tolerance, making it one of the most preferred insulation materials. However, the cured product of a conventional epoxy resin contains hydroxyl groups with high polarity, which results in insufficiently low dielectric properties at high frequencies.

In addition, conventional low dielectric epoxy resin has a relatively high melting point and high viscosity in the molten state at high temperatures, making it unsuitable for use in solvent-free liquid encapsulation materials.

SUMMARY

According to embodiments of the disclosure, the disclosure provides an encapsulant composition. The encapsulant composition may include 20-45 parts by weight of component (A), 55-80 parts by weight of component (B), and component (C). The total weight of the component (A) and the component (B) is 100 parts by weight, and the weight ratio of the component (C) to the component (A) may be 1:100 to 5:100. The component (A) includes a first compound (A-1) and a second compound (A-2). The component (B) is a non-modified inorganic powder or a modified inorganic powder. The component (C) is an initiator. The first compound (A-1) may be a compound having a structure represented by Formula (I) or Formula (II). The second compound (A-2) may be monoalkenyl aromatic compound Formula (I)

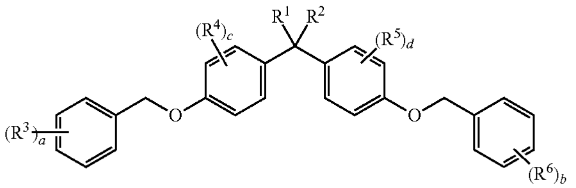

Formula (II)

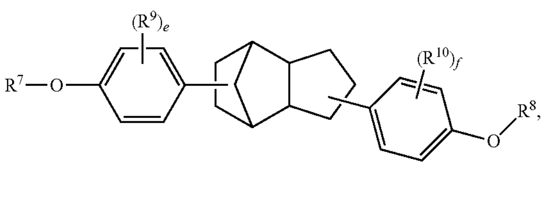

wherein $R^1$ and $R^2$ are independently hydrogen, fluorine, methyl group, fluoromethyl group, or ethyl group; $R^3$, $R^4$, $R^5$ and $R^6$ are independently fluorine, $C_{1-6}$ alkyl group, $C_{1-6}$ fluoroalkyl group, or $C_{2-6}$ terminal alkenyl group, and at least two of $R^3$, $R^4$, $R^5$ and $R^6$ are $C_{2-6}$ alkenyl group; $R^7$ and $R^8$ are independently $C_{2-6}$ terminal alkenyl group, 2-vinylphenyl group, 3-vinylphenyl group, or 4-vinylphenyl group; $R^9$ and $R^{10}$ are independently fluorine, $C_{1-6}$ alkyl group, $C_{1-6}$ fluoroalkyl group, or $C_{2-6}$ terminal alkenyl group; a and b are independently 1, 2, 3, 4, or 5; and, c, d, e and f are independently 1, 2, 3, or 4.

According to embodiments of the disclosure, the disclosure also provides a film, wherein the film includes a cured product of the encapsulant composition of the disclosure.

DETAILED DESCRIPTION OF DISCLOSED EMBODIMENTS

The encapsulant composition and film of the disclosure are described in detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept may be embodied in various forms without being limited to those exemplary embodiments. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments. As used herein, the term "about" in quantitative terms refers to plus or minus an amount that is general and reasonable to persons skilled in the art.

The disclosure provides an encapsulant composition, which is a low viscosity resin composition at room temperature and does not contain organic solvents or azeotropic agents, serving as solvent-free liquid encapsulation materials. The encapsulant composition of the disclosure can be used as an adhesive such as anisotropic conductive adhesives, bottom-fill underfill adhesives, B-stage bonding films, or liquid mold encapsulant. By means of the compounds with specific structures (such as specific resin derived from cycloalkane and specific monofunctional diluents) and the specific ingredient ratios, the encapsulant composition of the disclosure can be cured through a neat reaction, resulting in a film (i.e., encapsulation material). The film derived from the cured product of the encapsulant composition exhibits not only a low dielectric coefficient (Dk) and low dielectric loss factor (Df) in the high frequency range (above 10 GHz), but also low elastic modulus and high glass transition temperature. These characteristics meet the requirements of packaging materials, such as those used in high frequency semiconductor packaging processes.

According to embodiments of the disclosure, the encapsulant composition of the disclosure can include 20-45 parts by weight of component (A), 55-80 parts by weight of component (B), and component (C). The total weight of the component (A) and the component (B) may be 100 parts by weight, and the weight ratio of the component (C) to the component (A) may be 1:100 to 5:100 (such as 2:100, 3:100 or 4:100).

According to embodiments of the disclosure, the component (A) can include a first compound (A-1) and a second compound (A-2). According to embodiments of the disclosure, the weight ratio of the first compound (A-1) to the second compound (A-2) is 9:1 to 3:7 (such as 8:2, 7:3, 6:4, 5:5, or 4:6). When the weight ratio of the first compound (A-1) to the second compound (A-2) is too high, the encapsulant composition can easily yield over-crosslinked products during the curing process, which may lead to material brittleness.

When the weight ratio of the first compound (A-1) to the second compound (A-2) is too low, the encapsulant composition does not have formability.

According to embodiments of the disclosure, the first compound (A-1) (such as resin derived from cycloalkane) may be a compound having a structure represented by Formula (I) or Formula (II)

Formula (I)

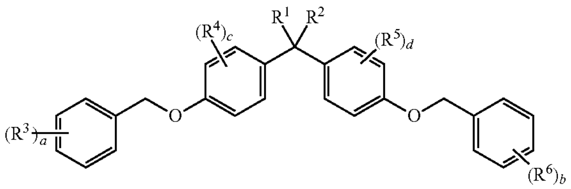

Formula (II)

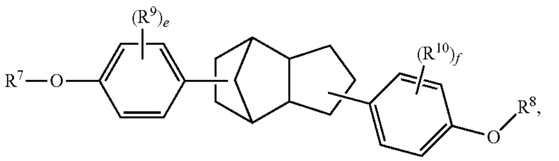

wherein $R^1$ and $R^2$ are independently hydrogen, fluorine, methyl group, fluoromethyl group, or ethyl group; $R^3$, $R^4$, $R^5$ and $R^6$ are independently fluorine, $C_{1-6}$ alkyl group, $C_{1-6}$ fluoroalkyl group, or $C_{2-6}$ terminal alkenyl group, and At least two of R3, R4, R5 and R6 are $C_{2-6}$ alkenyl group; $R^7$ and $R^8$ are independently $C_{2-6}$ terminal alkenyl group, 2-vinylphenyl group, 3-vinylphenyl group, or 4-vinylphenyl group; $R^9$ and $R^{10}$ are independently fluorine, $C_{1-6}$ alkyl group, $C_{1-6}$ fluoroalkyl group, or $C_{2-6}$ terminal alkenyl group; a and b are independently 1, 2, 3, 4, or 5; and, c, d, e and f are independently 1, 2, 3, or 4. When a is 2, 3, 4, or 5, $R^3$ are independently fluorine, $C_{1-6}$ alkyl group, $C_{1-6}$ fluoroalkyl group, or $C_{2-6}$ terminal alkenyl group; when b is 2, 3, 4, or 5, $R^6$ are independently fluorine, $C_{1-6}$ alkyl group, $C_{1-6}$ fluoroalkyl group, or $C_{2-6}$ terminal alkenyl group; when c is 2, 3, or 4, $R^4$ are independently fluorine, $C_1$-6 alkyl group, $C_{1-6}$ fluoroalkyl group, or $C_{2-6}$ terminal alkenyl group; when d is 2, 3, or 4, $R^5$ are independently fluorine, $C_{1-6}$ alkyl group, $C_{1-6}$ fluoroalkyl group, or $C_{2-6}$ terminal alkenyl group; when e is 2, 3, or 4, $R^9$ are independently fluorine, $C_{1-6}$ alkyl group, $C_{1-6}$ fluoroalkyl group, or $C_{2-6}$ terminal alkenyl group; and, when f is 2, 3, or 4, $R^{10}$ are independently fluorine, $C_{1-6}$ alkyl group, $C_{1-6}$ fluoroalkyl group, or $C_{2-6}$ terminal alkenyl.

According to embodiments of the disclosure, $C_{1-6}$ alkyl group may be linear or branched alkyl group. For example, $C_{1-6}$ alkyl group may be methyl, ethyl, propyl, butyl, pentyl, hexyl, or an isomer thereof. According to embodiments of the disclosure, $C_{1-6}$ fluoroalkyl group can be an alkyl group which a part of or all hydrogen atoms bonded on the carbon atom are replaced with fluorine atoms, and $C_{1-6}$ fluoroalkyl group can be linear or branched, such as fluoromethyl, fluoroethyl, fluoropropyl, fluorobutyl, fluoropentyl, fluorohexyl or an isomer thereof. Herein, the fluoromethyl group may be monofluoromethyl group, difluoromethyl group or trifluoromethyl group, and fluoroethyl can be monofluoroethyl group, difluoroethyl group, trifluoroethyl group, tetrafluoroethyl, or perfluoroethyl. According to embodiments of the disclosure, $C_{2-6}$ alkenyl group may be linear or branched alkenyl group. For example, $C_{2-6}$ alkenyl group may be vinyl group, allyl group, methallyl group, butenyl group, pentenyl group, or 6-hexenyl group.

According to embodiments of the disclosure, the first compound (A-1) may be

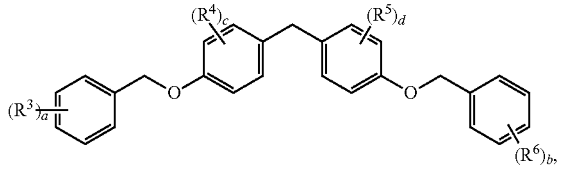

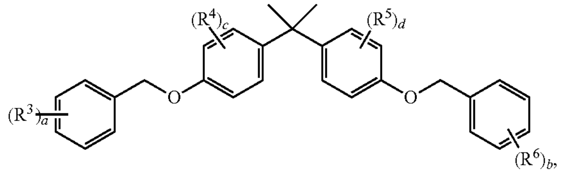

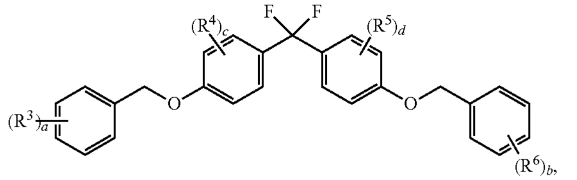

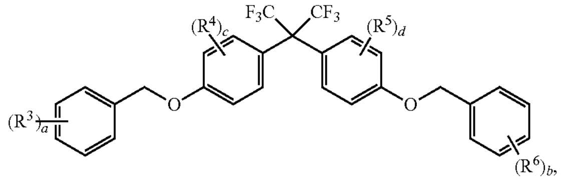

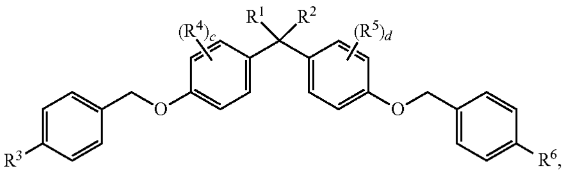

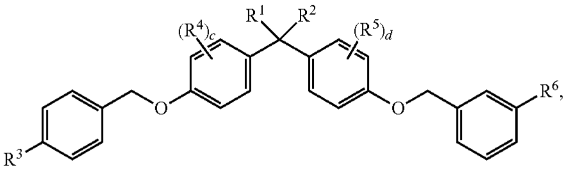

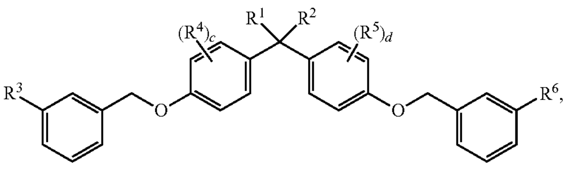

-continued

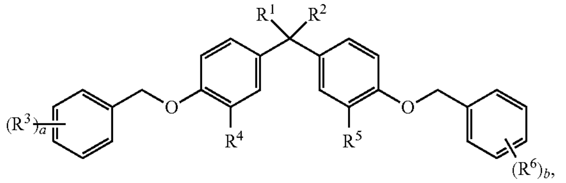

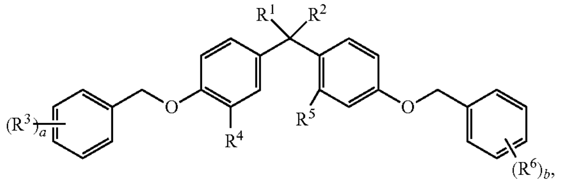

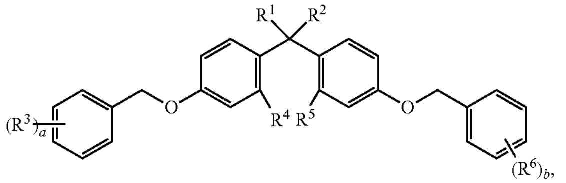

wherein $R^1$ and $R^2$ are independently hydrogen, fluorine, methyl group, fluoromethyl group, or ethyl group; $R^3$, $R^4$, $R^5$ and $R^6$ are independently fluorine, $C_{1-6}$ alkyl group, $C_{1-6}$ fluoroalkyl group, or $C_{2-6}$ terminal alkenyl group, and at least two of $R^3$, $R^4$, $R^5$ and $R^6$ are $C_{2-6}$ alkenyl group; a and b are independently 1, 2, 3, 4, or 5; and, c and d are independently 1, 2, 3, or 4.

According to embodiments of the disclosure, the compound having the structure of Formula (I) may have four terminal alkenyl groups. For example, in the compound having the structure of Formula (I), $R^3$, $R^4$, $R^5$ and $R^6$ are independently $C_{2-6}$ terminal alkenyl group, and a, b, c and d are 1. Namely, the first compound (A-1) may have at least four arms, which is capable of free-radical polymerization, therefore exhibiting high cross-linking reactivity. As a result, the dielectric coefficient (Dk) and dielectric loss factor (Df) of the cured product of the encapsulant composition can be further reduced, thereby improving dielectric stability. According to embodiments of the disclosure, the first compound (A-1) having four $C_{2-6}$ terminal alkenyl may be

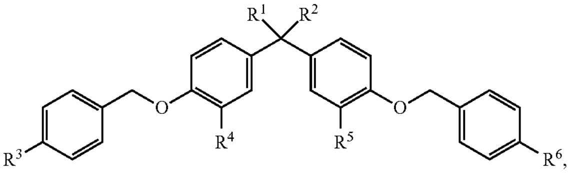

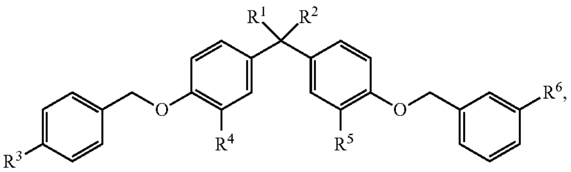

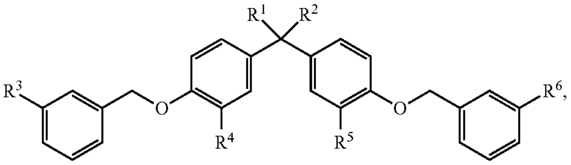

-continued

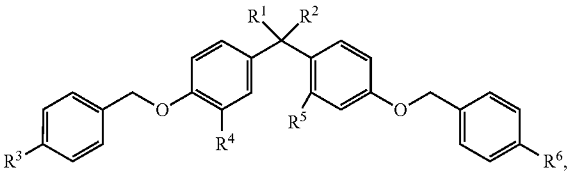

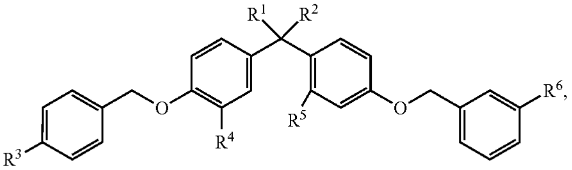

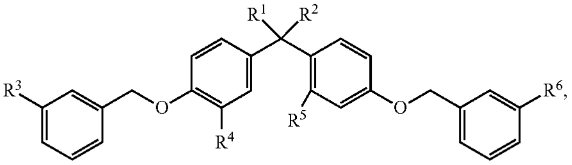

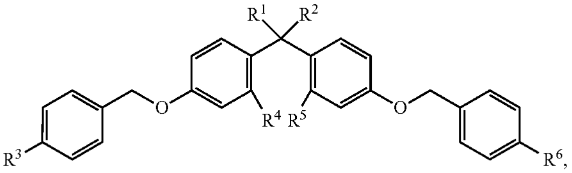

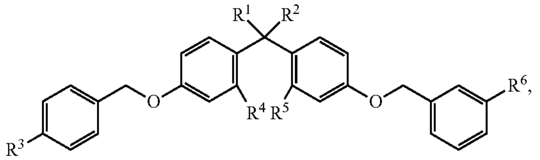

or

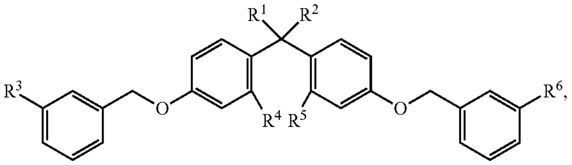

wherein $R^3$, $R^4$, $R^5$ and $R^6$ may be independently vinyl group, allyl group, methallyl group, butenyl group, pentenyl group, or hexenyl group.

According to embodiments of the disclosure, the first compound (A-1) may be

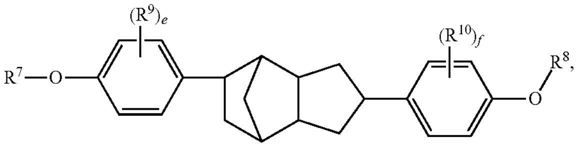

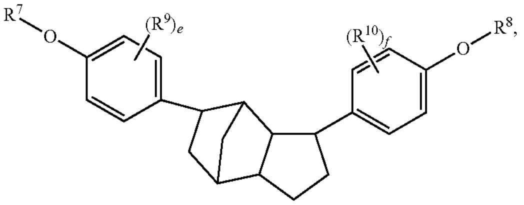

or

-continued

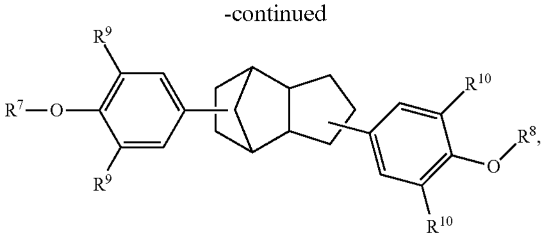

wherein $R^7$ and $R^8$ may be independently $C_{2-6}$ terminal alkenyl group, 2-vinylphenyl group, 3-vinylphenyl group, or 4-vinylphenyl group; $R^9$ and $R^{10}$ may be independently fluorine, $C_{1-6}$ alkyl group, $C_{1-6}$ fluoroalkyl group, or $C_{2-6}$ terminal alkenyl group; and, e and f are independently 1, 2, 3, or 4.

According to embodiments of the disclosure, the compound having the structure of Formula (II) may have four terminal alkenyl groups. For example, when the compound having the structure of Formula (II) and e is 1, $R^9$ is $C_{2-6}$ terminal alkenyl group; when f is 1, $R^{10}$ is $C_{2-6}$ terminal alkenyl group; when e is 2, 3, or 4, at least one of $R^9$ is $C_{2-6}$ terminal alkenyl group; and, when f is 2, 3, or 4, at least one of $R^{10}$ id $C_{2-6}$ terminal alkenyl. Namely, the first compound may have at least four arms, which is capable of free-radical polymerization, therefore exhibiting high cross-linking reactivity. As a result, the dielectric coefficient (Dk) and dielectric loss factor (Df) of the cured product of the encapsulant composition can be further reduced, thereby improving dielectric stability.

According to embodiments of the disclosure, the second compound (A-2) may be a monoalkenyl aromatic compound, which serves as a monofunctional diluent to adjust the viscosity of the encapsulant composition to avoid the formation of over-crosslinked products during the curing process.

According to embodiments of the disclosure, the second compound (A-2) may be styrene, α-methylstyrene, 2-methylstyrene, 3-styrenemethylstyrene (3-methylstyrene), 4-styrenemethylstyrene (4-methylstyrene), 2,4-styrenemethylstyrene (2,4-dimethylstyrene), 2,4-diisopropylstyrene, 4-propylstyrene, 4-cyclohexylstyrene, 4-(p-methylphenyl) styrene, 2-tert-butylstyrene, 3-tert-butylstyrene, 4-tert-butylstyrene, N,N-dimethylaminoethylstyrene, 1-vinyl-5-hexylnaphthalene, N-(4-vinylbenzyl)-N,N-dimethylamine, 2-vinylpyridine, 4-ethenyl-1,2-dimethyl-benzene, 1-vinylnaphthalene, 1,1-diphenylethylene, 2-propenylbenzene, or a combination thereof.

According to embodiments of the disclosure, when the monoalkenyl aromatic compound is a monoalkenyl aromatic compound without alkoxy group, the dielectric coefficient (Dk) and dielectric loss factor (Df) of the cured product of the encapsulant composition can be further reduced. For example, the monoalkenyl aromatic compound is not 4-tert-butoxystyrene (tBOS).

According to embodiments of the disclosure, the component (A) of the disclosure may consist of the first compound (A-1) and the second compound (A-2).

According to embodiments of the disclosure, the component (A) may additionally further includes a third compound (A-3), wherein the third compound (A-3) may be a multi-alkenyl compound in order to adjust the cross-linking reactivity of the encapsulant composition. According to embodiments of the disclosure, the weight ratio of the second compound (A-2) to the third compound (A-3) may be 1:1 to 9:1, such as 2:1, 3:1, 4:1, 5:1, 6:1, 7:1, or 8:1.

According to embodiments of the disclosure, the component (A) of the disclosure may consist of the first compound (A-1), the second compound (A-2), and third compound (A-3).

According to embodiments of the disclosure, the third compound (A-3) may be divinylbenzene, trivinylbenzene, triallyl cyanurate, triallyl isocyanurate, di(ethylene glycol) divinyl ether, tetraallylsilane, polybutadiene, 2,2-bis[3-allyl-4-(4-vinylbenzyl)phenyl]propane, AV-BPA), or a combination thereof.

According to embodiments of the disclosure, except the component (A), the encapsulant composition of the disclosure does not include other reactive resin or reactive monomer (i.e. reactive monomer for forming polymer).

According to embodiments of the disclosure, the component (B) may be a non-modified inorganic powder or a modified inorganic powder.

According to embodiments of the disclosure, the non-modified inorganic powder or the modified inorganic powder has an average particle size of 0.5 μm to 20 μm, such as 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, or 19 μm.

According to embodiments of the disclosure, the maximum particle size of the non-modified inorganic powder or the modified inorganic powder may be 1 μm to 75 μm, such as 5 μm, 10 μm, 15 μm, 20 μm, 25 μm, 30 μm, 35 μm, 40 μm, 45 μm, 50 μm, 55 μm, 60 μm, 65 μm, or 70 μm.

According to embodiments of the disclosure, the component (B) (non-modified inorganic powder or modified inorganic powder) may include a first powder (B-1) having a first average particle size and a second powder (B-2) having a second average particle size. According to embodiments of the disclosure, the component (B) (non-modified inorganic powder or modified inorganic powder) may consist of a first powder (B-1) having a first average particle size and a second powder (B-2) having a second average particle size.

According to embodiments of the disclosure, the first average particle size is greater than the second average particle size. According to embodiments of the disclosure, the first average particle size may be 0.75 μm to 20 μm, such as 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, or 19 μm. According to embodiments of the disclosure, the second average particle size may be 0.5 μm to 13.34 μm, such as 1 μm, 2 μm, 3 μm, 4 μm, 5 μm, 6 μm, 7 μm, 8 μm, 9 μm, 10 μm, 11 μm, 12 μm, or 13 μm. According to embodiments of the disclosure, the ratio of the first average particle size to the second average particle size may be 1.5 to 10, such as 2, 3, 4, 5, 6, 7, 8, or 9. When both the first and second average particle sizes fall within the aforementioned range, a cured product with better filling density and lower viscosity can be obtained.

According to embodiments of the disclosure, the weight ratio of the first powder (B-1) and the second powder (B-2) may be 1:5 to 5:1, such as 1:4, 1:3, 1:2, 1:1, 2:1, 3:1, or 4:1. When the weight ratio of the first powder (B-1) to the second powder (B-2) is within the aforementioned range, a cured product with better filling density and lower viscosity can be obtained.

According to embodiments of the disclosure, the non-modified inorganic powder may be silicon oxide, aluminum oxide, titanium oxide, zirconium oxide, or a combination thereof. According to embodiments of the disclosure, the modified inorganic powder may be a reaction product of an oxide and a modifier, wherein the oxide is silicon oxide, aluminum oxide, titanium oxide, or zirconium oxide, and the modifier is organosilane. According to embodiments of the disclosure, the weight ratio of the oxide and the modifier may be 1:9 to 9:1, such as 2:8, 3:7, 4:6, 5:5, 6:4, 7:3, or 8:2.

According to embodiments of the disclosure, the modifier may be vinyltrichlorosilane, vinyltrimethoxysilane, vinyltriethoxysilane, (4-ethenylphenyl)trimethoxy-silane, 2-(3,4epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2(-aminoethyl) 3-aminopropylmethyldimethoxysilane, N-2(-aminoethyl) 3-aminopropyltrimethoxysilane, N-2(-aminoethyl) 3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, vinyltris(2-methoxyethoxy)silane, vinylmethyldimethoxysilane, 3-mercaptopropyltriethoxysilane, 3-octanoylthio-1-propyltriethoxysilane, 3-isocyanatepropyltrimethoxysilane, 3-triethoxysilyl-N-(1,3-dimethyl-butylidene), 3-acryloxypropyltrimethoxysilane, 3-glycidoxypropylmethyldimethoxysilane, bis[3-(triethoxysilyl)propyl]disulfide, vinyltriacetoxysilane, vinyltriisopropoxysilane, allyltrimethoxysilane, diallyldimethylsilane, 3-mercaptopropyltriethoxysilane, N-(1,3-dimethylbutylidene)-3-aminopropyltriethoxysilane, trimethyltriethenyl cyclotrisiloxane, tetramethyltetraethenyl cyclotetrasiloxane, pentamethylpentaethenyl cyclopentasiloxane, or a combination thereof.

According to embodiments of the disclosure, the component (C) may be an initiator, such as peroxide initiator According to embodiments of the disclosure, the initiator of the disclosure has a one hour half-life temperature of 110° C. to 130° C. For example, the initiator may be tert-butyl peroxy-3,5,5-trimethylhexanoate, tert-amylperoxy 2-ethylhexyl carbonate, 1,1-di(tert-butylperoxy)cyclohexane, 1,1-di-(tert-butylperoxy)-3,3,5-trimethylcyclohexane, 2,2-bis (tert-butylperoxy)butane, or a combination thereof.

According to embodiments of the disclosure, the encapsulant composition of the disclosure may consist of the component (A), the component (B) and the component (C).

According to embodiments of the disclosure, the encapsulant composition of the disclosure may additionally further include a component (D), wherein the component (D) is a silane coupling agent in order to increase the compatibility and dispersibility of the component (A) and the component (B). According to embodiments of the disclosure, the weight ratio of the component (D) to the component (A) may be 0.1:100 to 5:100, such as 0.5:100, 1:100, 2:100, 3:100, or 4:100.

According to embodiments of the disclosure, the silane coupling agent may be vinyltrichlorosilane, vinyltrimethoxysilane, vinyltriethoxysilane, (4-ethenylphenyl)trimethoxysilane, 2-(3,4epoxycyclohexyl)ethyltrimethoxysilane, 3-glycidoxypropyltrimethoxysilane, 3-glycidoxypropylmethyldiethoxysilane, 3-glycidoxypropyltriethoxysilane, p-styryltrimethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2(-aminoethyl) 3-aminopropylmethyldimethoxysilane, N-2(-aminoethyl) 3-aminopropyltrimethoxysilane, N-2(aminoethyl) 3-aminopropyltriethoxysilane, 3-aminopropyltrimethoxysilane, 3-aminopropyltriethoxysilane, 3-triethoxysilyl-N-(1,3-dimethyl-butylidene)propylamine, (N-phenyl-3-aminopropyltrimethoxysilane, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, vinyltris(2-methoxyethoxy)silane, vinylmethyldimethoxysilane, 3-mercaptopropyltriethoxysilane, 3-octanoylthio-1-propyltriethoxysilane, 3-isocyanatepropyltrimethoxysilane, 3-triethoxysilyl-N-(1,3-dimethyl-butylidene), -acryloxypropyltrimethoxysilane, 3-glycidoxypropylmethyldimethoxysilane, bis[3-(triethoxysilyl)propyl]disulfide, vinyltriacetoxysilane, vinyltriisopropoxysilane, allyltrimethoxysilane, diallyldimethylsilane, 3-mercaptopropyltriethoxysilane, N-(1,3-dimethylbutylidene)-3-aminopropyltriethoxysilane, trimethyltriethenyl cyclotrisiloxane, tetramethyltetraethenyl cyclotetrasiloxane, pentamethylpentaethenyl cyclopentasiloxane, or a combination thereof.

According to embodiments of the disclosure, encapsulant composition of the disclosure may consist of the component (A), the component (B), the component (C) and the component (D).

According to embodiments of the disclosure, encapsulant composition of the disclosure may additionally further include a component (E), wherein the component (E) is an additive. The additive may be a conventional additive of the encapsulant composition, such as leveling agent, defoamer, flame retardant, viscosity modifier, thixotropic agent, dispersant, stabilizer, or a combination thereof. According to embodiments of the disclosure, the amount of the additive is not limited and may be optionally modified by a person of ordinary skill in the field. The amount of the additive may be about 0.1 wt % to 30 wt % (such as about 0.2 wt %, 0.5 wt %, 0.8 wt %, 1 wt %, 1.5 wt %, 2 wt %, 2.5 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 25 wt %, or 28 wt %), based on the total weight of the component (A) and the component (B).

According to embodiments of the disclosure, since the epoxy compound exhibits fluidity at low temperatures (such as 25° C. to 90° C.), the composition of the disclosure does not contain solvents when used as a packaging material composition and can be directly applied in the packaging process.

According to embodiments of the disclosure, encapsulant composition of the disclosure may consist of the component (A), the component (B), the component (C), the component (D) and the component (E). According to embodiments of the disclosure, the disclosure the disclosure also provides a cured product of the encapsulant composition of the disclosure. According to embodiments of the disclosure, the cured product may be a reaction product of the composition of the disclosure via a curing process.

The preparation of the cured product may have following steps. First, an encapsulant composition of the disclosure is provided. Next, the encapsulant composition is coated on a substrate to form a coating via a coating process. Next, the coating is subjected to a curing process, obtaining the cured product (such as a film). The curing process has a temperature of about 80° ° C. to 190° C. and has a process time period of 30 minutes to 8 hours. In addition, the curing process can include several heating stages. According to embodiments of the disclosure, the substrate is not limited and can be optionally modified by a person of ordinary skill in the field. The substrate may be metal sheet, silicon substrate, glass, or polymer film. Any desired layer can be formed on the substrate at first.

According to embodiments of the disclosure, the disclosure the disclosure also provides a film (i.e. packaging material), wherein the film includes the cured product of the encapsulant composition of the disclosure.

Below, exemplary embodiments will be described in detail with reference to the accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLE

Encapsulant Composition

Example 1

10 parts by weight of Compound (1) (with a structure of

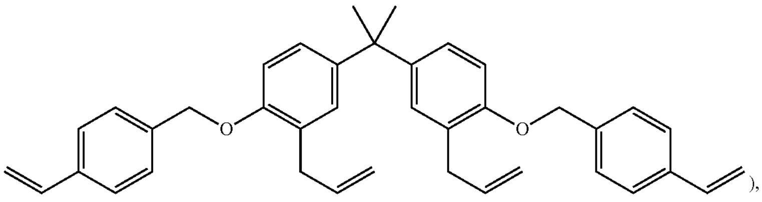 [SMILES: C=CCc1cc(C(C)(C)c2ccc(OCc3ccc(C=C)cc3)c(CC=C)c2)ccc1OCc1ccc(C=C)cc1]

), 10 parts by weight of 4-tert-butylstyrene (tBS), 0.6 parts by weight of tert-butyl peroxy-3,5,5-trimethylhexanoate (TBPIN), 0.4 parts by weight of vinyltriethoxysilane, 64 parts by weight of silicon dioxide powder (1) (modified by vinyl triethoxysilane, with an average particle size of about 20 μm and a maximum particle size of about 75 μm), and 16 parts by weight of silicon dioxide powder (2) (modified by vinyl triethoxysilane, with an average particle size of about 12 μm and a maximum particle size of about 45 μm) were mixed at room temperature by a mixer, obtaining a mixture. The mixture was dispersed by a three-roller, obtaining Encapsulant composition (1).

Example 2

12.5 parts by weight of compound (2) (with a structure of

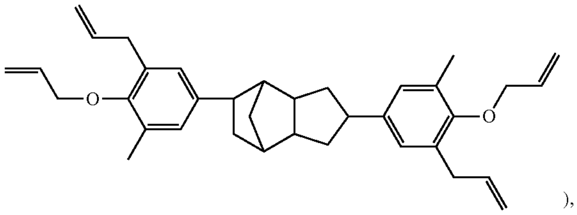 [SMILES: C=CCOc1c(C)cc(C2CC3C4CC(c5cc(C)c(OCC=C)c(CC=C)c5)C(C4)C3C2)cc1CC=C]

), 12.5 parts by weight of 4-tert-butylstyrene (tBS), 0.75 parts by weight of tert-butyl peroxy-3,5,5-trimethylhexanoate (TBPIN), 0.5 parts by weight of vinyltriethoxysilane, and 75 parts by weight of silicon dioxide powder (3) (modified by vinyl triethoxysilane, with an average particle size of about 3.1 μm and a maximum particle size of about 10 μm) were mixed at room temperature by a mixer, obtaining a mixture. The mixture was dispersed by a three-roller, obtaining Encapsulant composition (2).

Example 3

22.5 parts by weight of compound (2) (with a structure of

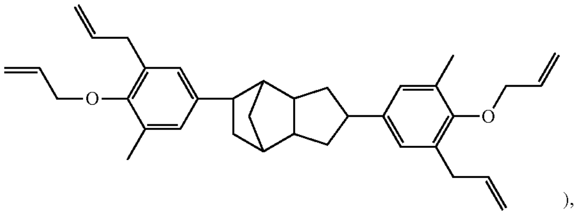 [SMILES: C=CCOc1c(C)cc(C2CC3C4CC(c5cc(C)c(OCC=C)c(CC=C)c5)C(C4)C3C2)cc1CC=C]

), 22.5 parts by weight of 4-tert-butylstyrene (tBS), 1.35 parts by weight of tert-butyl peroxy-3,5,5-trimethylhexanoate (TBPIN), 0.9 parts by weight of vinyltriethoxysilane, 44 parts by weight of silicon dioxide powder (3) (modified by vinyl triethoxysilane, with an average particle size of about 3.1 μm and a maximum particle size of about 10 μm), and 11 parts by weight of silicon dioxide powder (4) (modified by vinyl triethoxysilane, with an average particle size of about 0.6 μm and a maximum particle size of about 3 μm) were mixed at room temperature by a mixer, obtaining a mixture. The mixture was dispersed by a three-roller, obtaining Encapsulant composition (3).

Example 4

20 parts by weight of compound (2) (with a structure of

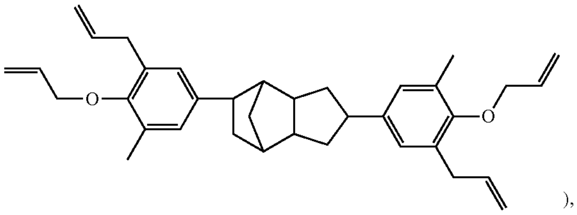 [SMILES: C=CCOc1c(C)cc(C2CC3C4CC(c5cc(C)c(OCC=C)c(CC=C)c5)C(C4)C3C2)cc1CC=C]

), 5 parts by weight of 4-tert-butylstyrene (tBS), 1 parts by weight of tert-butyl peroxy-3,5,5-trimethylhexanoate (TBPIN), 0.5 parts by weight of vinyltriethoxysilane, 60 parts by weight of silicon dioxide powder (3) (modified by vinyl triethoxysilane, with an average particle size of about 3.1 μm and a maximum particle size of about 10 μm), and 15 parts by weight of silicon dioxide powder (4) (modified by vinyl triethoxysilane, with an average particle size of about 0.6 μm and a maximum particle size of about 3 μm) were mixed at room temperature by a mixer, obtaining a mixture. The mixture was dispersed by a three-roller, obtaining Encapsulant composition (4).

Example 5

18 parts by weight of compound (2) (with a structure of

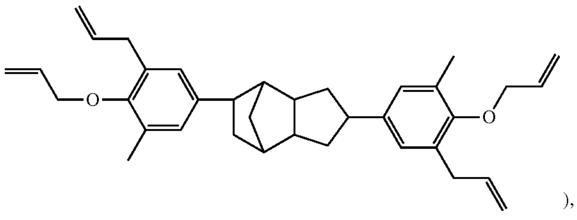 [SMILES: C=CCOc1c(C)cc(C2CC3C4CC(c5cc(C)c(OCC=C)c(CC=C)c5)C(C4)C3C2)cc1CC=C]

), 27 parts by weight of 4-tert-butylstyrene (tBS), 0.9 parts by weight of tert-butyl peroxy-3,5,5-trimethylhexanoate (TBPIN), 0.9 parts by weight of vinyltriethoxysilane, 44 parts by weight of silicon dioxide powder (3) (modified by vinyl triethoxysilane, with an average particle size of about 3.1 μm and a maximum particle size of about 10 μm), and 11 parts by weight of silicon dioxide powder (4) (modified by vinyl triethoxysilane, with an average particle size of about 0.6 μm and a maximum particle size of about 3 μm) were mixed at room temperature by a mixer, obtaining a mixture. The mixture was dispersed by a three-roller, obtaining Encapsulant composition (5).

Example 6

10 parts by weight of compound (1) (with a structure

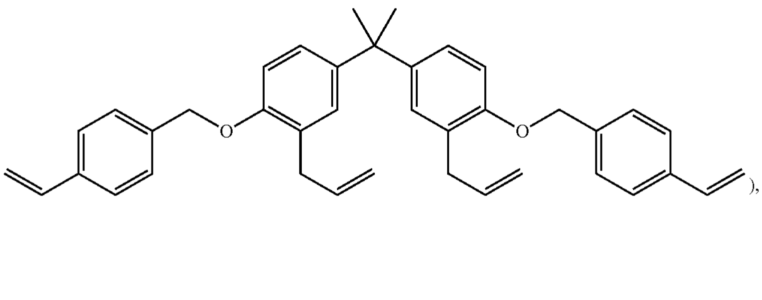 [SMILES: C=CCc1cc(C(C)(C)c2ccc(OCc3ccc(C=C)cc3)c(CC=C)c2)ccc1OCc1ccc(C=C)cc1]

), 10 parts by weight of 4-tert-butylstyrene (tBS), 0.6 parts by weight of tert-butyl peroxy-3,5,5-trimethylhexanoate (TBPIN), 0.4 parts by weight of vinyltriethoxysilane, 64 parts by weight of silicon dioxide powder (5) (non-modified, average particle size of about 20 μm and a maximum particle size of about 75 μm), and 16 parts by weight of silicon dioxide powder (6) (non-modified, average particle size of about 12 μm and a maximum particle size of about 45 μm) were mixed at room temperature by a mixer, obtaining a mixture. The mixture was dispersed by a three-roller, obtaining Encapsulant composition (6).

Example 7

12.5 parts by weight of compound (2) (with a structure of

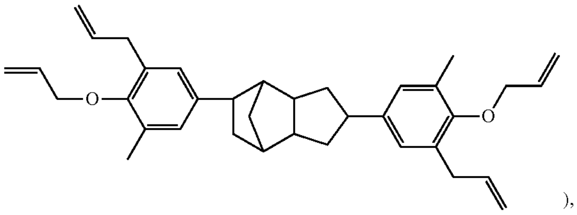 [SMILES: C=CCOc1c(C)cc(C2CC3C4CC(c5cc(C)c(OCC=C)c(CC=C)c5)C(C4)C3C2)cc1CC=C]

), 12.5 parts by weight of 4-tert-butoxystyrene (tBOS), 0.75 parts by weight of tert-butyl peroxy-3,5,5-trimethylhexanoate (TBPIN), 0.5 parts by weight of vinyltriethoxysilane, 60 parts by weight of silicon dioxide powder (3) (modified by vinyl triethoxysilane, with an average particle size of about 3.1 μm and a maximum particle size of about 10 μm), and 15 parts by weight of silicon dioxide powder (4) (modified by vinyl triethoxysilane, with an average particle size of about 0.6 μm and a maximum particle size of about 3 μm) were mixed at room temperature by a mixer, obtaining a mixture. The mixture was dispersed by a three-roller, obtaining Encapsulant composition (7).

Comparative Example 1

6.5 parts by weight of epoxy resin (commercially available from Daicel chemical with a trade number of CELLOXIDE 2021P), 3.5 parts by weight of (commercially available from DIC with a trade number of EXA-830LVP), 15 parts by weight of anhydride (commercially available from Resonac Corporation with a trade number of HN-2200), 0.5 parts by weight of vinyltriethoxysilane, 60 parts by weight of silicon dioxide powder (3) (modified by vinyl triethoxysilane, with an average particle size of about 3.1 μm and a maximum particle size of about 10 μm), and 15 parts by weight of silicon dioxide powder (4) (modified by vinyl triethoxysilane, with an average particle size of about 0.6 μm and a maximum particle size of about 3 μm) were mixed at room temperature by a mixer, obtaining a mixture. The mixture was dispersed by a three-roller, obtaining Encapsulant composition (8).

Comparative Example 2

5 parts by weight of compound (1) (with a structure of)

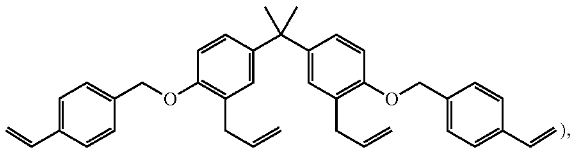 [SMILES: C=CCc1cc(C(C)(C)c2ccc(OCc3ccc(C=C)cc3)c(CC=C)c2)ccc1OCc1ccc(C=C)cc1]

), 20 parts by weight of 4-tert-butylstyrene (tBS), 0.5 parts by weight of tert-butyl peroxy-3,5,5-trimethylhexanoate (TBPIN), 1 parts by weight of vinyltriethoxysilane, 60 parts by weight of silicon dioxide powder (3) (modified by vinyl triethoxysilane, with an average particle size of about 3.1 μm and a maximum particle size of about 10 μm), and 15 parts by weight of silicon dioxide powder (4) (modified by vinyl triethoxysilane, with an average particle size of about 0.6 μm and a maximum particle size of about 3 μm) were mixed at room temperature by a mixer, obtaining a mixture. The mixture was dispersed by a three-roller, obtaining Encapsulant composition (9).

Properties Test of Encapsulant Composition

The viscosity of Encapsulant compositions (1)-(9) were measured, and the results are shown in Table 1. The method for measuring the viscosity of the encapsulant composition was measured by cone-and-plate viscometer (Brookfield 87333) at room temperature (25° C.).

TABLE 1

| | viscosity (Pa · S) (25° C.) |
|---|---|
| Encapsulant composition (1) | 6.8 |
| Encapsulant composition (2) | 17.8 |
| Encapsulant composition (3) | 13.5 |
| Encapsulant composition (4) | 26.3 |
| Encapsulant composition (5) | 11.8 |
| Encapsulant composition (6) | 5.9 |
| Encapsulant composition (7) | 16.5 |
| Encapsulant composition (8) | 46.5 |
| Encapsulant composition (9) | 9.2 |

As shown in Table 1, Encapsulant compositions (1)-(7) of the disclosure at room temperature (such as 25° C.) exhibits fluidity and can be applied in solvent-free liquid packaging processes.

Properties Test of Cured Product

Encapsulant compositions (1)-(9) were poured into a mold (80 mm×15 mm×3 mm). After multiple vacuum degassing processes, the encapsulant compositions were cured at 100° ° C. for 1 hour and 135° C. for 6 hours, obtaining Cured products (1)-(8). It was observed that Encapsulant composition (9) could not be molded.

Cured products (1)-(8) were cut to obtain Samples (1)-(8) with a size of 60 mm×15 mm×3 mm. Next, the elastic modulus, glass transition temperature (Tg), dielectric coefficient (Dk), and dielectric loss factor (Df) of Samples (1)-(8) were measured, and the results are shown in Table 2.

The elastic modulus was measured using a dynamic mechanical analyzer (DMA). The test was conducted under nitrogen gas, with a temperature range of 0° ° C. to 250° C. and a heating rate of 10° C. per minute. The elastic modulus of the samples at 25° C. was recorded. The glass transition temperature was determined from the peak of the tan delta curve. The dielectric coefficient (Dk) and dielectric loss factor (Df) were measured using a vector network analyzer (VNA) with an open resonant cavity at frequencies of 28 GHz and 60 GHz at 25° C.

TABLE 2

| | | glass | | 28 GHz | | 60 GHz | |
|---|---|---|---|---|---|---|---|
| | moldability | transition temperature (° C.) | elastic modulus (GPa) | dielectric coefficient (Dk) | dielectric loss factor (Df) | dielectric coefficient (Dk) | dielectric loss factor (Df) |
| Encapsulant composition (1) | ○ | 188 | 12.9 | 3.28 | 0.003 | 3.15 | 0.003 |
| Encapsulant composition (2) | ○ | 188 | 7.2 | 3.12 | 0.003 | 3.05 | 0.002 |
| Encapsulant composition (3) | ○ | 186 | 7.5 | 3.01 | 0.003 | 2.99 | 0.002 |
| Encapsulant composition (4) | ○ | 192 | 6.2 | 3.1 | 0.004 | 3.05 | 0.003 |
| Encapsulant composition (5) | ○ | 186 | 7.3 | 3.05 | 0.003 | 2.98 | 0.002 |
| Encapsulant composition (6) | ○ | 181 | 13.1 | 3.52 | 0.003 | 3.46 | 0.004 |
| Encapsulant composition (7) | ○ | 182 | 6.5 | 2.88 | 0.017 | 2.64 | 0.014 |
| Encapsulant composition (8) | ○ | 175 | 14 | 3.51 | 0.009 | — | — |
| Encapsulant composition (9) | X | — | — | — | — | — | — |

As shown in Table 2, Encapsulant composition (9) could not be molded after the curing process since the ratio of the first compound (A-1) and second compound (A-2) is outside the range as disclosed in the disclosure. Furthermore, Table 2 shows that the cured products of Encapsulant compositions (1)-(7) in the disclosure have a dielectric coefficient (Dk) of less than 3.55 and a dielectric loss factor (Df) of less than 0.02 at 28 GHz, as well as the dielectric coefficient (Dk) of less than 3.50 and the dielectric loss factor (Df) of less than 0.015 at 60 GHz. It should be noted that the cured products of Encapsulant compositions (1)-(6) of the disclosure have the dielectric loss factor (Df) of less than 0.005 at both 28 GHz and 60 GHz.

By means of the compounds with specific structures (such as specific resin derived from cycloalkane and specific monofunctional diluents) and the specific ingredient ratios, the encapsulant composition of the disclosure can be cured through a neat reaction, obtaining a film (i.e. encapsulation material). The film derived from the cured product of the encapsulant composition exhibits not only a low dielectric coefficient (Dk) and low dielectric loss factor (Df) in the high frequency range (above 10 GHz), but also low elastic modulus and high glass transition temperature. These characteristics meet the requirements of packaging materials, such as those used in high frequency semiconductor packaging processes.

It will be clear that various modifications and variations can be made to the disclosed methods and materials. It is intended that the specification and examples be considered as exemplary only, with the true scope of the disclosure being indicated by the following claims and their equivalents.

What is claimed is:

1. An encapsulant composition, comprising:

20-45 parts by weight of a component (A), wherein the component (A) comprises a first compound (A-1) and a second compound (A-2), and the weight ratio of the first compound (A-1) to the second compound (A-2) is 9:1 to 3:7;

55-80 parts by weight of a component (B), wherein the component (B) is a non-modified inorganic powder or a modified inorganic powder, and the total weight of the component (A) and the component (B) is 100 parts by weight; and a component (C), wherein the component (C) is an initiator, and the weight ratio of the component (C) to the component (A) is 1:100 to 5:100, wherein the first compound (A-1) has a structure represented by Formula (I) or Formula (II), and the second compound (A-2) is monoalkenyl aromatic compound Formula (I)

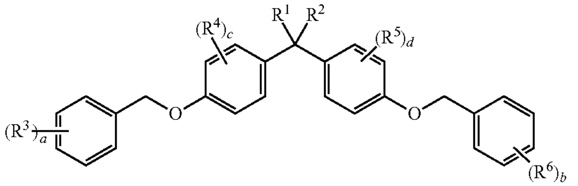

-continued

Formula (II)

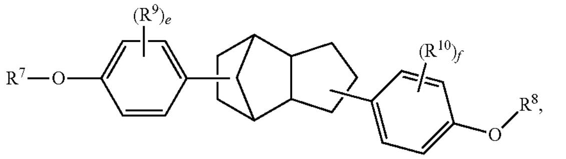

wherein $R^1$ and $R^2$ are independently hydrogen, fluorine, methyl group, fluoromethyl group, or ethyl group; $R^3$, $R^4$, $R^5$ and $R^6$ are independently fluorine, $C_{1-6}$ alkyl group, $C_{1-6}$ fluoroalkyl group, or $C_{2-6}$ terminal alkenyl group, and at least two of $R^3$, $R^4$, $R^5$ and $R^6$ are $C_{2-6}$ terminal alkenyl group; $R^7$ and $R^8$ are independently $C_{2-6}$ terminal alkenyl group, 2-vinylphenyl group, 3-vinylphenyl group, or 4-vinylphenyl group; $R^9$ and $R^{10}$ are independently fluorine, $C_{1-6}$ alkyl group, $C_{1-6}$ fluoroalkyl group, or $C_{2-6}$ terminal alkenyl group; a and b are independently 1, 2, 3, 4, or 5; c, d, e and f are independently 1, 2, 3, or 4.

2. The encapsulant composition as claimed in claim 1, wherein the non-modified inorganic powder is silicon oxide, aluminum oxide, titanium oxide, zirconium oxide, or a combination thereof.

3. The encapsulant composition as claimed in claim 1, wherein the modified inorganic powder is a reaction product of an oxide and a modifier, wherein the oxide is silicon oxide, aluminum oxide, titanium oxide, or zirconium oxide, and the modifier is organosilane.

4. The encapsulant composition as claimed in claim 1, wherein the first compound (A-1) is

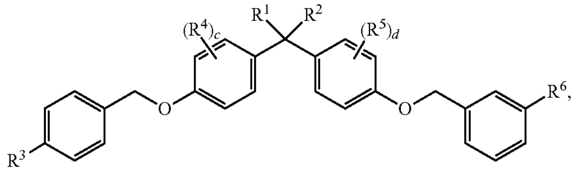

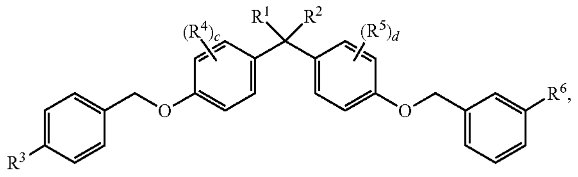

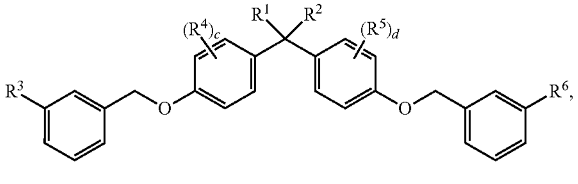

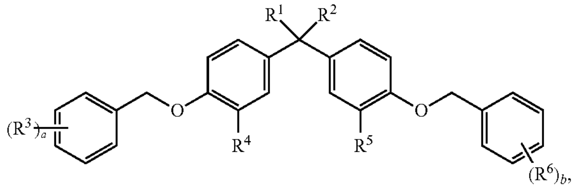

-continued

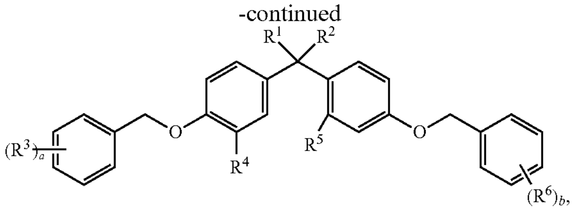

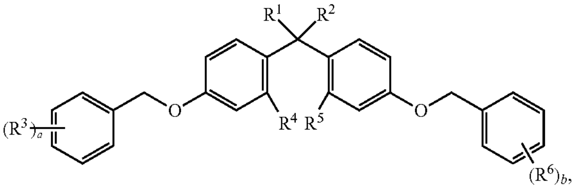

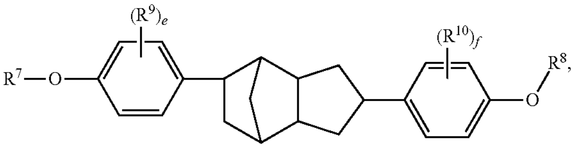

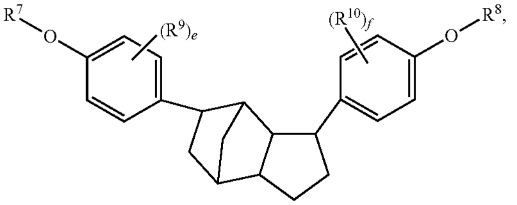

or

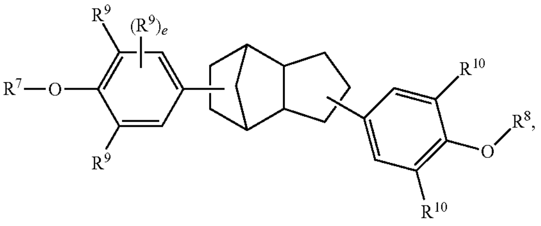

wherein $R^1$ and $R^2$ are independently hydrogen, fluorine, methyl group, fluoromethyl group, or ethyl group; $R^3$, $R^4$, $R^5$ and $R^6$ are independently fluorine, $C_{1-6}$ alkyl group, $C_{1-6}$ fluoroalkyl group, or $C_{2-6}$ terminal alkenyl group, and at least two of $R^3$, $R^4$, $R^5$ and $R^6$ are $C_{2-6}$ terminal alkenyl group; $R^7$ and $R^5$ are independently $C_{2-6}$ terminal alkenyl group, 2-vinylphenyl group, 3-vinylphenyl group, or 4-vinylphenyl group; $R^9$ and $R^{10}$ are independently fluorine, $C_{1-6}$ alkyl group, $C_{1-6}$ fluoroalkyl group, or $C_{2-6}$ terminal alkenyl group; a and b are independently 1, 2, 3, 4, or 5; and, c, d, e and f are independently 1, 2, 3, or 4.

5. The encapsulant composition as claimed in claim 1, wherein the second compound (A-2) is styrene, α-methylstyrene, 2-methylstyrene, 3-methylstyrene, 4-methylstyrene, 2,4-styrenemethylstyrene (2,4-dimethylstyrene), 2,4 diisopropylstyrene, 4-propylstyrene, 4-cyclohexylstyrene, 4-(p-methylphenyl)styrene, 2-tert-butylstyrene, 3-tert-butylstyrene, 4-tert-butylstyrene, N,N-dimethylaminoethylstyrene, 1-vinyl-5-hexylnaphthalene, N-(4-vinylbenzyl)-N,N-dimethylamine, 2-vinylpyridine, 4-ethenyl-1,2-dimethyl-benzene, 1-vinylnaphthalene, 1,1-diphenylethylene, 2-propenylbenzene, or a combination thereof.

6. The encapsulant composition as claimed in claim 1, wherein the initiator is a peroxide initiator.

7. The encapsulant composition as claimed in claim 1, further comprising a component (D), wherein the component (D) is a silane coupling agent, wherein the weight ratio of the component (D) to the component (A) is 1:100 to 5:100.

8. The encapsulant composition as claimed in claim 1, wherein the non-modified inorganic powder or the modified inorganic powder has an average particle size of 0.5 μm to 20 μm.

9. The encapsulant composition as claimed in claim 1, wherein the non-modified inorganic powder or the modified inorganic powder consists of a first powder (B-1) having a first average particle size and a second powder (B-2) having a second average particle size, wherein the first average particle size is greater than the second average particle size, and the ratio of the first average particle size to the second average particle size is 1.5 to 10.

10. The encapsulant composition as claimed in claim 9, wherein the weight ratio of the first powder (B-1) to the second powder (B-2) is 1:5 to 5:1.

11. The encapsulant composition as claimed in claim 1, wherein the component (A) further comprises a third compound (A-3), wherein the third compound (A-3) is a multialkenyl compound.

12. The encapsulant composition as claimed in claim 11, wherein the third compound (A-3) is divinylbenzene, trivinylbenzene, triallyl cyanurate, triallyl isocyanurate, di(ethylene glycol) divinyl ether, tetraallylsilane, polybutadiene, diallyl phthalate, 2,2-bis[3-allyl-4-(4-vinylbenzyl)phenyl] propane (AV-BPA), or a combination thereof.

13. The encapsulant composition as claimed in claim 11, wherein the weight ratio of the second compound (A-2) to the third compound (A-3) is 1:1 to 9:1.

14. A film, comprising a cured product of the encapsulant composition as claimed in claim 1.

* * * * *